United States Patent Office 3,014,895
Patented Dec. 26, 1961

3,014,895
DIAMINODIPHENYLSULFONE GLYCIDYL RESINS
Harold C. Reynolds, Plainfield, N.J., Robert C. O'Neill, New York, N.Y., and John D. Garber, Westfield, N.J., assignors to Merck & Co., Inc., Rahway, N.J., a corporation of New Jersey
No Drawing. Filed Mar. 19, 1958, Ser. No. 722,360
11 Claims. (Cl. 260—79.3)

This invention relates to glycidyl diaminodiphenylsulfones.

The compounds of the present invention include monomers having the general formula:

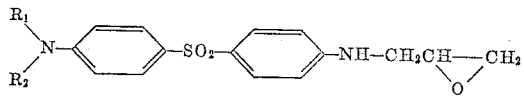

where $R_1$ nd $R_2$ are selected from the group consisting of hydrogen and the glycidyl radical having the formula

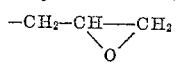

and to polymers of the above compounds. Monomers contain either one, two, or three glycidyl radicals per molecule as shown in the above formula.

The products of this invention are a new class of compounds which may be termed expoxy-polyamine reaction products. The compounds of the present invention are surprisingly stable in view of the fact that they contain both amino and epoxy groups which normally interact even at room temperature. While applicants do not wish to be bound by any theory, the absence of such interaction at ordinary temperatures in the compounds of this invention is apparently due to the low basicity of diaminodiphenylsulfone.

High heat distortion points, in some cases as high as 300° C., and good chemical resistance, are characteristic of polymers of this invention. Because of this combination of properties, these polymers are useful in various applications where metal or ceramic formerly was required. A further advantage of the resins of this invention is that no curing agent is necessary. This eliminates numerous difficulties associated with curing agents, such as inaccurate proportioning and inadequate mixing, premature curing, handling problems due to toxicity or irritation (particularly in the case of aliphatic amines), low solubility of curing agents, and deleterious effects of residual functional groups on electrical properties and chemical resistance.

The compounds of the present invention are made by reacting epichlorohydrin with 4,4'-diaminodiphenylsulfone, and converting the resulting reaction product with an alkali metal hydroxide or other base to a glycidyl diaminodiphenylsulfone. The glycidyl diaminodiphenylsulfones polymerize at elevated temperatures to form a variety of resins.

The reactions which can be carried out according to this invention may be illustrated by the following equation:

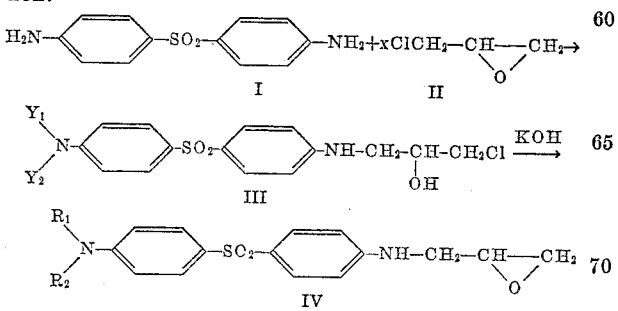

In the above equation $R_1$ and $R_2$ are either hydrogen or the glycidyl radical as previously indicated, $Y_1$ and $Y_2$ are either hydrogen or the 3-chloro-2-hydroxypropyl radical having the formula

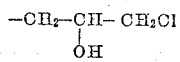

and $x$ is an integer having a value of 1 to 3 inclusive. The foregoing equation indicates the quantities of reagents actually entering into reaction.

Reaction of diaminodiphenylsulfone (I) with epichlorohydrin (II) is the first step in the process according to the present invention. The mole ratio of epichlorohydrin to diaminodiphenylsulfone in the reactant feed is governed by the type of end product desired. Generally approximately stoichiometric quantities of reagents are used. For example, where the desired final product is diglycidyl diaminodiphenylsulfone or a polymer thereof, the mole ratio of epichlorohydrin to diaminodiphenylsulfone is about 2:1. The product of this reaction step is predominantly di(3-chloro-2-hydroxypropyl)diaminodiphenylsulfone, with some mono- and tri(3-chloro-2-hydroxypropyl)-diaminodiphenylsulfone also formed. Reaction products consisting predominantly of either mono- (3-chloro-2-hydroxypropyl)diaminodiphenylsulfone or tri(3-chloro-2-hydroxypropyl)diaminodiphenylsulfone can be formed from a reactant mixture of epichlorohydrin and diaminodiphenylsulfone in the approximate mole ratios, 1:1 and 3:1 respectively. An excess of either reagent can be used, however; and the mole ratio of epichlorohydrin to diaminodiphenylsulfone may be in the range of about 0.8:1 to about 5:1.

The reaction of epichlorohydrin with diaminodiphenylsulfone may be carried out in a solvent medium such as dioxane, tetrahydrofuran, acetone, excess epichlorohydrin, or in the absence of a solvent. It is preferred to add a Lewis acid catalyst such as boron trifluoride, a complex boron trifluoride with another substance such as the 1:1 (mole ratio) boron trifluoride-diethyl ether complex, zinc chloride, and the like. This reaction is carried out at elevated temperatures. The presence of unreacted epichlorohydrin is readily determinable by heating a small sample of the reaction product with a solution of lepidine in diethylene glycol. A bright blue color develops if epoxide groups are present.

The reaction products (III) are solid materials which can be isolated from solution by evaporation of the solvent, and subsequently redissolved and dehydrohalogenated. It is not necessary to recover these reaction products in solid form. Instead, they can be dehydrohalogenated directly without removal of solvent.

The reaction product (III) of diaminodiphenylsulfone and epichlorohydrin is dehydrohalogenated with a base such as sodium hydroxide, potassium hydroxide, calcium oxide, calcium hydroxide, alkali silicate, or sodium carbonate in a suitable solvent such as tetrahydrofuran, acetone, or dioxane, or in the absence of a solvent. This reaction may be carried out at elevated temperatures such as reflux temperature. The product (IV), which is a mixture of mono-, di-, and triglycidyl diaminodiphenylsulfone, plus dimers thereof, can be recovered as a solid or liquid product by evaporation of the solvent. Evaporation at reduced pressure is useful in order to prevent or minimize polymer formation. The glycidyl diaminodiphenylsulfones can be stored at room temperatures for long periods of time without polymerization. As a further safeguard against polymer formation, the monomer can be stored as a solution in a solvent such as tetrahydrofuran, dioxane, or the like.

Polymers of this invention are formed simply by heating the monomers to curing temperature. Curing is carried out as a rule at temperatures of about 90° to 140°

C., and can be followed by a post-curing period at higher temperatures of about 170° to 200° C.

A wide variety of polymers can be formed according to the present invention. The properties of the polymer are influenced to a considerable extent by the number of glycidyl units per mole of glycidyl diphenylsulfone monomer.

Monoglycidyl diaminodiphenylsulfone polymerizes with itself to form linear or branched thermoplastic polymers. These polymers may be used as bonding layers in laminates. They may also be copolymerized with various polymer-forming materials such as ethylene oxide, propylene oxide, phthalic anhydride, diamines, the diglycidyl ether of bis-phenol A, and fatty or resin acids, to form thermosetting resins.

Diglycidyl diaminodiphenylsulfone polymerizes with itself to form thermosetting epoxy resins which are useful for potting or encapsulating electrical components, and in making laminates with glass fiber or cloth. Shrinkage on curing is very slight. These resins are hard at room temperatures and at the elevated temperatures encountered in electrical apparatus such as motors. The heat distortion points range from about 150° to 300° C., or even higher.

Polymers of triglycidyl diaminodiphenylsulfone are prepared in the same manner as the polymers of diglycidyl diaminodiphenylsulfone and have similar properties.

An outstanding feature of this invention in one aspect is the elimination of curing agents. However, it is possible to polymerize the monomers of this invention using curing agents when properties other than those of the unmodified polymers are desired. Various curing agents, particularly amines such as diaminodiphenylsulfone, diethylene triamine, m-phenylene diamine, terpene diamine, or anhydrides such as phthalic, pyromellitic anhydride, and the like may be used. Acidic materials such as boron trifluoride and various complexes thereof, e.g. the condensation product of boron trifluoride and ethylamine, are also suitable as curing agents.

Copolymers of glycidyl diaminodiphenylsulfone with other materials can be made according to this invention. Among the materials suitable for copolymerization are epoxy resins, phenolic resins, polyamides, proteins, polyethylene imines and the like.

The examples which follow illustrate specific embodiments of the present invention.

The Barcol hardness measurements in the following examples are the readings obtained with a Barcol Model GYZJ-934-1 Impressor, made by the Barber-Colman Co., by Rockford, Illinois. Heat distortion points were determined by measuring hardness at various temperatures and extrapolating to zero Barcol hardness.

Spot check analyses for the presence of epoxy groups were made by taking a 0.1-ml. sample of the solution to be analyzed, adding an equal volume of a 5% solution of lepidine in diethylene glycol, and heating the mixture in a test tube to the boiling point of diethylene glycol. A dark blue color indicates the presence of epoxy groups. Quantitative determinations of epoxy groups were made according to the procedure reported by E. C. Dearborn et al., Ind. Eng. Chem., 45, 2715 (1953), and the results are reported herein as the epoxide equivalent weight.

EXAMPLE 1

(A) *Monoglycidyl diaminodiphenylsulfone monomer*

A solution of 49.6 g. (0.2 mole) of diaminodiphenylsulfone in 100 ml. of dioxane was heated to boiling and cooled slightly. To this solution 0.5 ml. of a 47% solution of 1:1 (mole ratio) boron trifluoride-ether complex in ether was added. This was followed by dropwise addition of 18.5 g. (0.2 mole) of epichlorohydrin over a half-hour period. The warm solution was stirred and slowly cooled. Stirring was continued for a total of two hours, at the end of which time the solution was found to give a negative test with lepidine. The solvent was removed at a pressure of 4 mm. and a gradually rising temperature which reached a final value of 140°. The remaining solid material was a light red product, consisting essentially of (3-chloro-2-hydroxypropyl)-diaminodiphenylsulfone, having the formula

Yield 68.6 g. (100%).

*Analysis.*—Calculated: N, 8.56%; Cl, 10.40%. Found: N, 8.56%; Cl, 9.24%.

The (3-chloro-2-hydroxypropyl)diaminodiphenylsulfone was dissolved in 200 ml. of warm tetrahydrofuran. The solution was cooled to room temperature and 14.0 g. (0.264 mole) of powdered potassium hydroxide was added in portions. After the addition of potassium hydroxide was complete, the solution was heated to reflux and maintained at that temperature for 45 minutes with stirring. The stirring was then stopped and the slurry permitted to settle. The supernatant liquid was tested for chlorine, which test was negative. The slurry was filtered. The filtrate consisted of 230.3 g. of a solution of the product in tetrahydrofuran. The amount of product glycidyl diaminodiphenylsulfone in the solution was 60.8 g. This product was essentially the monoglycidyl diaminodiphenylsulfone having the formula

The solid monoglycidyl diaminodiphenylsulfone was recovered by distillation of the tetrahydrofuran at 3 mm. pressure and room temperature. The last traces of tetrahydrofuran were removed by dissolving the product in acetone and adding ether until precipitation occurred. The mixture of acetone, ether, and traces of tetrahydrofuran was decanted and discarded. This procedure was repeated three times. The product was then dissolved in acetone, precipitated with benzene, the liquid mixture of acetone and benzene decanted. The product was frozen in a Dry Ice-acetone mixture and dried to a powder at 2 mm. pressure in the frozen state. Yield 45.7%; M.P. 70° C.; epoxide equivalent weight 387 (theoretical 304).

*Analysis.*—Calculated: C, 59.25%; H, 5.30%; N, 9.22%. Found: C, 59.38%; H, 5.02%; N, 8.59%.

(B) *Polymerization of monoglycidyl diaminodiphenylsulfone*

The monoglycidyl diaminodiphenylsulfone powder prepared as above-described was heated at 100° C. for one-half hour, and then placed in a mold and heated at 180° C. and 10,000 pounds per square inch pressure for one and one-half hours. A hard dense mass of cured polymer having a Barcol hardness of 30 at 25° C. resulted.

EXAMPLE 2

(A) *Diglycidyl diaminodiphenylsulfone monomer*

To a solution of 496 g. (2 moles) of diaminodiphenylsulfone in 1 liter of acetone, 10 ml. of a 47% (by weight) solution of boron trifluoride-ether complex in ether was added. The solution was heated to reflux while stirring. To the hot solution 370 g. (4 moles) of epichlorohydrin was added dropwise with a slight evolution of heat. Refluxing with stirring was continued for 18 hours. At that time a negative lepidine test indicated the absence of epoxide. Heating was discontinued. The solvent was removed by distillation at 5 mm. pressure and 135° C. A red solid product, which was essentially di(3- chloro-2-hydroxypropyl)diaminodiphenylsulfone monomer having the formula

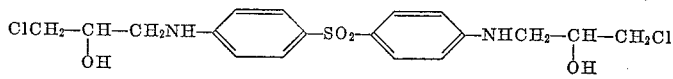

was obtained. Yield 870.5 g. (100%).

*Analysis.*—Calculated: N, 6.47%; Cl, 16.40%. Found: N, 6.80%; Cl, 13.51%.

The mole ratio of chlorine to nitrogen (0.814:1), coupled with infra-red absorption data, indicates that over 80% of the nitrogen atoms were mono-substituted.

The di(3-chloro-2-hydroxypropyl)diaminodiphenylsulfone was dissolved in 850 ml. of tetrahydrofuran. The solution was heated to a temperature slightly below reflux temperature with stirring, and 227 g. (4 moles) of powdered potassium hydroxide was added. Stirring was continued for four hours at reflux temperature. The potassium hydroxide gradually dissolved and crystalline potassium chloride gradually precipitated. After four hours the stirring was stopped, and the slurry was permitted to settle. A test of the supernatant solution indicated no chlorine. The slurry was filtered, and sufficient solvent was evaporated at 90° to 100° C. and 20 mm. pressure to yield 941 g. of a 80% solution of diglycidyl diaminodiphenylsulfone in tetrahydrofuran (equivalent to 754 g. of solid diglycidyl diaminodiphenylsulfone). The epoxide equivalent weight, determined on an aliquot of the solution, was 248 (theoretical value 180). The solvent was removed by heating at 4 mm. pressure and maximum temperature of 170° C. The product diglycidyl diaminodiphenylsulfone, which had the formula

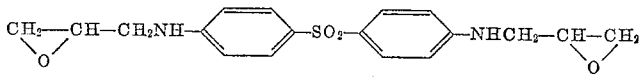

was in the molten state upon completion of the removal of solvent. A portion of the product was allowed to solidify and analyzed.

*Analysis.*—Calculated: C, 59.6%; H, 5.59%; N, 7.77%. Found: C, 60.57%; H, 5.62%; N, 7.17%.

(B) *Polymerization of diglycidyl diaminodiphenylsulfone monomer*

The molten diglycidyl diaminodiphenylsulfone monomer, prepared as described above, was cast into an aluminum mold and heated in an oven at 100° C. for five hours and then at 180° C. for one and one-half hours. A hard cake of cooled resin which shrank little on cooling was formed. The Barcol hardness at 25° C. was 52 and the apparent heat distortion point, 283° C.

EXAMPLE 3

(A) *Diglycidyl diaminodiphenylsulfone monomer*

A solution of 24.8 g. (0.1 mole) of diaminodiphenylsulfone, 18.5 (0.2 mole) of epichlorohydrin, 4 ml. of 4.7% solution of boron trifluoride-ether complex in ether, and 50 ml. of dioxane was gently refluxed for 20 hours. The flask containing the residue of di(3-chloro-2-hydroxypropyl)-diaminodiphenylsulfone was placed in an oil bath which was maintained at 200° C. and the dioxane evaporated at 2 mm. pressure. The dried product was a black oil having an odor of dioxane. Yield 36.5 g.

*Analysis.*—Calculated: N, 6.47%; Cl, 16.40%. Found: N, 5.86%; Cl, 14.71%.

The black oil product was redissolved in 150 ml. of dioxane, and 19.8 g. (0.31 mole) of powdered potassium hydroxide was added. The solution was refluxed for five hours, during which time a precipitate was formed. This precipitate was filtered off and analyzed for chlorine content. Analysis indicated 96% removal of the chlorine originally present in the solution. The filter cake was discarded. The filtrate was evaporated at 2 mm. pressure and 25° C. to remove the solvent dioxane. The final product diglycidyl diaminodiphenylsulfone monomer thus obtained was an oil containing 82.7% solids and the balance residual dioxane. The epoxide equivalent weight was 334 (theoretical value 180).

*Analysis.*—Calculated: C, 59.9%; H, 5.59%; N, 7.77%. Found: C, 59.36%; H, 6.00%; N, 6.78%.

(B) *Polymerization of diglycidyl diaminodiphenylsulfone Monomer*

The product monomer obtained above was heated for 16 hours at 130° C. and then for three hours at 170°–190° C. The cured resin had a Barcol hardness of 32 at 25° C. and an apparent heat distortion point of 156° C.

EXAMPLE 4

(A) *Triglycidyl diaminodiphenylsulfone monomer*

A mixture of 49.6 g. (0.2 mole) of diaminodiphenylsulfone and 1 ml. of 47% borontrifluoride-ether complex in 100 ml. of acetone was heated to reflux. To the hot solution 74.0 g. (0.8 mole) of epichlorohydrin was added dropwise. Refluxing was continued for 24 hours, at the end of which time a negative lepidine test indicated the absence of epoxy groups. The solvent was evaporated at 29 inches of mercury vacuum and a temperature of 90° to 100° C. A syrupy product, which was essentially tri(3 - chloro - 2 - hydroxypropyl)diaminodiphenylsulfone having the formula

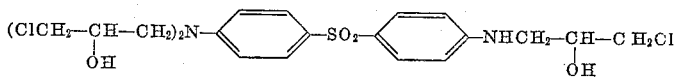

remained.

*Analysis.*—Calculated: N, 4.53%; Cl, 20.5%. Found: N, 4.52%; Cl, 17.80%.

The tri(3-chloro-2-hydroxypropyl)diaminodiphenylsulfone was dissolved in 100 ml. of tetrahydrofuran at room temperature, 45 g. 0.8 mole) of powdered potassium hydroxide was added. The amount of heat evolved was not sufficient to raise the temperature to reflux. The mixture was stirred and allowed to cool over a two-hour period to 25° C. At that time the stirrer was stopped and the slurry permitted to settle. A test on the supernatant solution for chlorine was negative. The slurry was filtered. The solvent was distilled from the filtrate at a low pressure of 2 mm. The product remaining was essentially triglycidyl diaminodiphenylsulfone having the formula

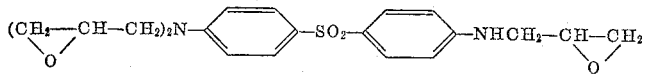

and an epoxide equivalent weight of 161 (theoretical value 139). Yield 78.1 g.; molecular weight 612 determined by depression of the freezing point of dioxane); E%, 781 at 308 mμ, 441 at 271 mμ methanol).

(B) *Polymerization of triglycidyl diaminodiphenylsulfone*

The product obtained in Example 6 was cured for 19 hours at 100° C., followed by three hours at 180° C.

The polymer thus obtained had a Barcol hardness of 41 at 26° C. and an apparent heat distortion point of 176° C.

EXAMPLE 5

*Diaminodiphenylsulfone-cured resin*

To 30 g. of diglycidyl diaminodiphenylsulfone was added 1.7 g. of diaminodiphenylsulfone. The mixture was cured for three hours at 175° C., producing a hard cured resin, having a Barcol hardness of 23 at 25° C. and a heat distortion point of about 142° C.

EXAMPLE 6

*Acid-cured diglycidyl diaminosulfone resin*

An acid-cured diglycidyl diaminodiphenylsulfone resin was prepared by mixing 30 g. of diglycidyl diaminodiphenylsulfone with 0.35 g. of a condensation product of boron trifluoride and ethylamine, and curing for 20 hours at 100° C., followed by three hours at 175° C. The resulting resin had a Barcol hardness of 39 at 25° C. and an apparent heat distortion point of about 158° C.

EXAMPLE 7

*Copolymer of diglycidyl diaminodiphenylsulfone with diglycidyl bis-phenol A*

A copolymer of bis(4-glycidoxyphenol)dimethylmethane and diglycidyl diaminodiphenylsulfone was prepared by mixing 217 g. of the former with 30 g. of the latter and curing for three hours at 175° C. The product was a hard resin having a Barcol hardness of 33 at 25° C. and a heat distortion point of about 171° C.

EXAMPLE 8

*Glass cloth laminate*

Seven squares of woven glass cloth which had been treated with steratochromyl chloride ("Volan A," made by E. I. du Pont de Nemours, Inc., Wilmington, Delaware) to increase adherence of solutions of monomer, were dipped in a 50% solution of diglycidyl diaminodiphenylsulfone monomer (prepared as described in Example 2) in tetrahydrofuran. The cloth squares were air-dried to a tacky state and joined to form a laminate. The laminate was initially cured at 100° C. for one hour between heated platens at contact pressure of less than 50 p.s.i. Final curing was effected at 180° C. for 90 minutes to yield a tough, stiff, insoluble sheet.

While the present invention has been described with reference to specific embodiments thereof, it is evident that various modifications can be made without departing from the present invention.

What is claimed is:

1. Compounds having the general formula

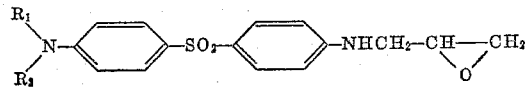

where $R_1$ and $R_2$ are selected from the group consisting of hydrogen and the radical

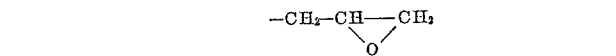

2. The compound having the formula

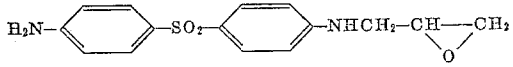

3. The compound having the formula

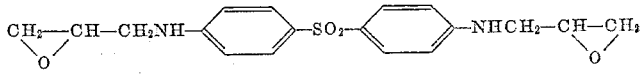

4. The compound having the formula

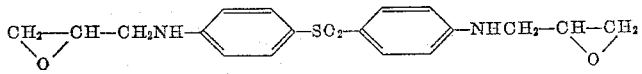

5. Compounds having the general formula

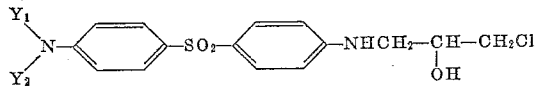

where $Y_1$ and $Y_2$ are selected from the group consisting of hydrogen and the radical having the formula

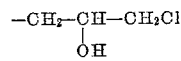

6. The compound having the formula

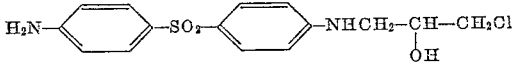

7. The compound having the formula

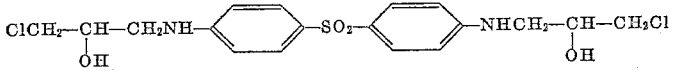

8. The compound having the formula

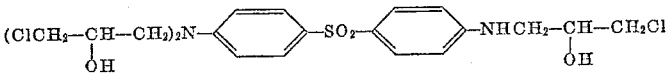

9. The insoluble, infusible polymer obtained by heating a compound of the formula

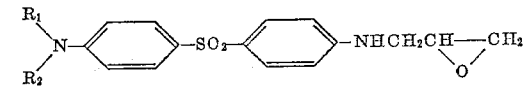

at a temperature of about 90–140° C. for from about one-half to nineteen hours in the absence of a solvent, where $R_1$ and $R_2$ are selected from the group consisting of hydrogen and the radical

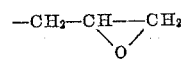

10. The process for making a (3-chloro-2-hydroxypropyl) diaminodiphenylsulfone of the formula

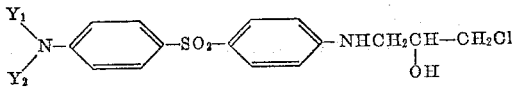

wherein $Y_1$ and $Y_2$ are selected from the class consisting of hydrogen and the 3-chloro-2-hydroxypropyl radical, that comprises reacting together diaminodiphenylsulfone and epichlorohydrin at elevated temperature in the presence of a catalyst selected from the group consisting of boron trifluoride and boron trifluoride-ether complex.

11. The process for making a compound of the formula

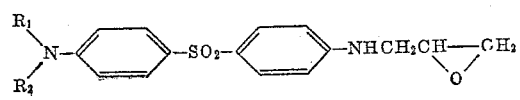

wherein $R_1$ and $R_2$ are selected from the group consisting of hydrogen and the radical

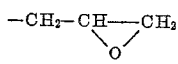

that comprises reacting diaminodiphenylsulfone with epichlorohydrin at elevated temperature in the presence of a catalyst selected from the class consisting of boron trifluoride and boron trifluoride-ether complex to form a compound of the formula

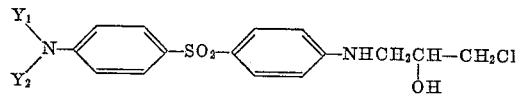

where $Y_1$ and $Y_2$ are selected from the class consisting of hydrogen and the radical

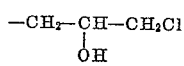

and heating said latter substance in the presence of an alkali metal hydroxide.

References Cited in the file of this patent

UNITED STATES PATENTS

| | | |
|---|---|---|
| 1,977,251 | Stallmann | Oct. 16, 1934 |
| 1,977,253 | Stallmann | Oct. 16, 1934 |
| 2,131,120 | Schlack | Sept. 27, 1938 |
| 2,765,322 | Beavers | Oct. 2, 1956 |
| 2,884,406 | Wegler et al. | Apr. 28, 1959 |
| 2,897,179 | Schecter et al. | July 28, 1959 |

OTHER REFERENCES

"Chemical and Engineering News," page 98, Mar. 18, 1957.

Chemical Abstracts, vol. 49, No. 2, January 1955, p. 1101.

Moeller: Inorganic Chemistry, Wiley & Sons (1952), pp. 326–328.

UNITED STATES PATENT OFFICE
CERTIFICATE OF CORRECTION

Patent No. 3,014,895                            December 26, 1961

Harold C. Reynolds et al.

It is hereby certified that error appears in the above numbered patent requiring correction and that the said Letters Patent should read as corrected below.

Column 8, claim 4, for the left-hand portion of the formula reading "$\underset{\diagdown O \diagup}{CH_2-CH}-CH_2NH-$" read -- $(\underset{\diagdown O \diagup}{CH_2-CH}-CH_2)_2N-$ --.

Signed and sealed this 24th day of April 1962.

(SEAL)
Attest:

ESTON G. JOHNSON                                         DAVID L. LADD

Attesting Officer                                             Commissioner of Patents